(12) United States Patent  (10) Patent No.: US 8,798,453 B2
Lawton  (45) Date of Patent: Aug. 5, 2014

(54) ATTACHMENT FOR A PERSONAL COMMUNICATION DEVICE

(75) Inventor: Thomas Alexander Lawton, Malmesbury (GB)

(73) Assignee: Bubblepix Limited, Ringwood, Hampshire (GB)

( * ) Notice: Subject to any disclaimer, the term of this patent is extended or adjusted under 35 U.S.C. 154(b) by 0 days.

(21) Appl. No.: 13/578,249

(22) PCT Filed: Feb. 10, 2011

(86) PCT No.: PCT/GB2011/000173
§ 371 (c)(1),
(2), (4) Date: Sep. 26, 2012

(87) PCT Pub. No.: WO2011/098760
PCT Pub. Date: Aug. 18, 2011

(65) Prior Publication Data
US 2013/0011127 A1    Jan. 10, 2013

(30) Foreign Application Priority Data

Feb. 10, 2010  (GB) .................................. 1002248.1

(51) Int. Cl.
*G03B 11/00*  (2006.01)
*H04N 7/00*  (2011.01)
(52) U.S. Cl.
USPC .......................................... 396/544; 348/36
(58) Field of Classification Search
CPC ........ G03B 35/00; G03B 37/00; G03B 37/02; G03B 37/04; G03B 37/06
USPC ............... 396/71, 351, 352, 544; 348/36, 373
See application file for complete search history.

(56) References Cited

U.S. PATENT DOCUMENTS

| 7,071,964 | B1 | 7/2006 | Glatt |
| 2003/0103267 | A1 | 6/2003 | Kasahara |
| 2009/0181729 | A1* | 7/2009 | Griffin et al. ............... 455/575.1 |
| 2010/0045773 | A1* | 2/2010 | Ritchey ........................... 348/36 |
| 2011/0043683 | A1* | 2/2011 | Beach et al. .................. 348/373 |
| 2011/0090626 | A1* | 4/2011 | Hoellwarth et al. ..... 361/679.01 |

FOREIGN PATENT DOCUMENTS

| DE | 202008015322 U1 | 2/2009 |
| WO | 03046632 A1 | 6/2003 |
| WO | 2006047649 A2 | 5/2006 |

* cited by examiner

*Primary Examiner* — WB Perkey
*Assistant Examiner* — Minh Phan
(74) *Attorney, Agent, or Firm* — Loginov & Associates, PLLC; William A. Loginov

(57) ABSTRACT

A personal communication device, such as a smartphone handset (1) comprises a main body (2) incorporating a camera (4) having a lens (5). An attachment (6) for the personal communication device is detachably mountable to the main body (2) by means of a cover (8). The attachment (6) also comprises an optical device (7) arranged to reflect light into the lens from a panoramic field of view. The optical device (7) includes a convex mirror (9), which preferably reflects light from a 360° field of view into the camera (4). Such an arrangement enables the user to completely capture an image of his surroundings, so that the image is an objective record of a moment in time as experienced by the user. The invention is more portable and versatile than previous arrangements.

14 Claims, 13 Drawing Sheets

ATTACHMENT FOR A PERSONAL COMMUNICATION DEVICE

FIELD OF THE INVENTION

The present invention relates to an attachment for a personal communication device (PCD), such as a mobile phone, personal digital assistant or other portable personal computer. The invention also relates to a combination of an attachment and a PCD.

BACKGROUND OF THE INVENTION

In recent years, there has been a massive growth in the use of PCDs as such devices have become lighter, cheaper and with greater processing power and battery life. The functionality of such devices has also increased: mobile phones, for example, typically incorporate features beyond making telephone calls and sending SMS messages, such as music and video playback, games and interne browsing. Another typical feature of a PCD is that of a built-in camera. The use of such cameras has proved increasingly popular. However, due to the limited technical specifications of such cameras, they have tended to be used for simple snapshots only.

SUMMARY OF THE INVENTION

The invention provides an attachment for a personal communication device comprising a main body incorporating a camera, the attachment comprising an optical device arranged to be detachably mountable to the main body in a fixed relationship with respect to the lens of the camera, the optical device being arranged to reflect light into the lens from a panoramic field of view.

The invention further provides a combination of a personal communication device having a main body incorporating a camera with an attachment, the attachment comprising an optical device arranged to be detachably mountable to the main body in a fixed relationship with respect to the lens of the camera, the optical device being arranged to reflect light into the lens from a panoramic field of view.

The provision of detachable optical device having a panoramic field of view gives the user greater versatility in taking photographs than was possible hitherto with a conventional built-in camera. The invention provides both the user and a viewer of the images with an all-seeing, exciting and immersive experience of the user's surroundings.

Preferably, the optical device is arranged to reflect light from a field of view of at least 180°, and more preferably substantially 360°. Such an arrangement enables the user to completely capture an image of his surroundings, so that the image is an objective record of a moment in time as experienced by the user. In this regard, such images may be useful for journalism, recording crime scenes, surveying and for insurance investigations, for example.

Advantageously, the optical device includes a light capturing device, such as a lens or mirror, which is located in a housing. The optical device has an operating position and a stored position. Adjustment of the optical device between the two positions may be effected by between an operating position and a stored position by relative movement between the light capturing device and a portion of the housing. In the stored position, the light capturing device is protected from damage by the housing. A user-operable mechanism is provided so that the user can control the position of the optical device by moving the light capturing device relative to part of the housing, or vice versa.

Preferably, the attachment includes a cover, which can be detachably mounted to a portion of the main body of the PCD. When the light capturing device is in the stored position, it is protected by a portion of the cover. The cover may be attached to the main body by means of a snap-fit or sliding arrangement, or by using fasteners. The cover may be made of a resilient material, such as rubber, in which case the cover may simply be stretched over the main body.

The optical device is preferably arranged so that, when the attachment is mounted to the main body of the personal communication device, the optical axis of the light capturing device is transverse to the optical axis of the camera lens. This permits a compact arrangement of components. The optical device preferably includes an arrangement of mirrors, arranged to reflect light into the lens of the camera in the manner of a periscope.

The PCD may include software arranged to process the data from the optical device and convert it into an image for viewing on the display of the personal communication device. This can provide real-time image capture and display.

The light capturing device may be a mirror or a lens. A suitable mirror is convex, having the shape of its reflective surface defined by a cubic equation.

The personal communication device may be a mobile phone, a smartphone, a personal digital assistant, a portable personal computer, such as a laptop or notebook, or a hand-held games console. The term "personal communication device" is also intended to encompass computer peripherals, games controllers and other accessories that communicate with other electronic devices.

A panoramic imaging device is described in CA 2,363,775, comprising an optical system incorporating a convex mirror arranged to capture a 360° image of a scene. In one embodiment, the imaging device includes a track, on which a conventional camera may be mounted and slidably moved towards and away from the optical system. In another embodiment, the convex mirror is an integral component of the camera. The devices disclosed in this document lack the versatility, convenience and portability of the present invention.

BRIEF DESCRIPTION OF THE DRAWINGS

The invention will now be described, by way of example, with reference to the accompanying drawings, in which.

DETAILED DESCRIPTION OF THE ILLUSTRATIVE EMBODIMENTS

Figure 1:
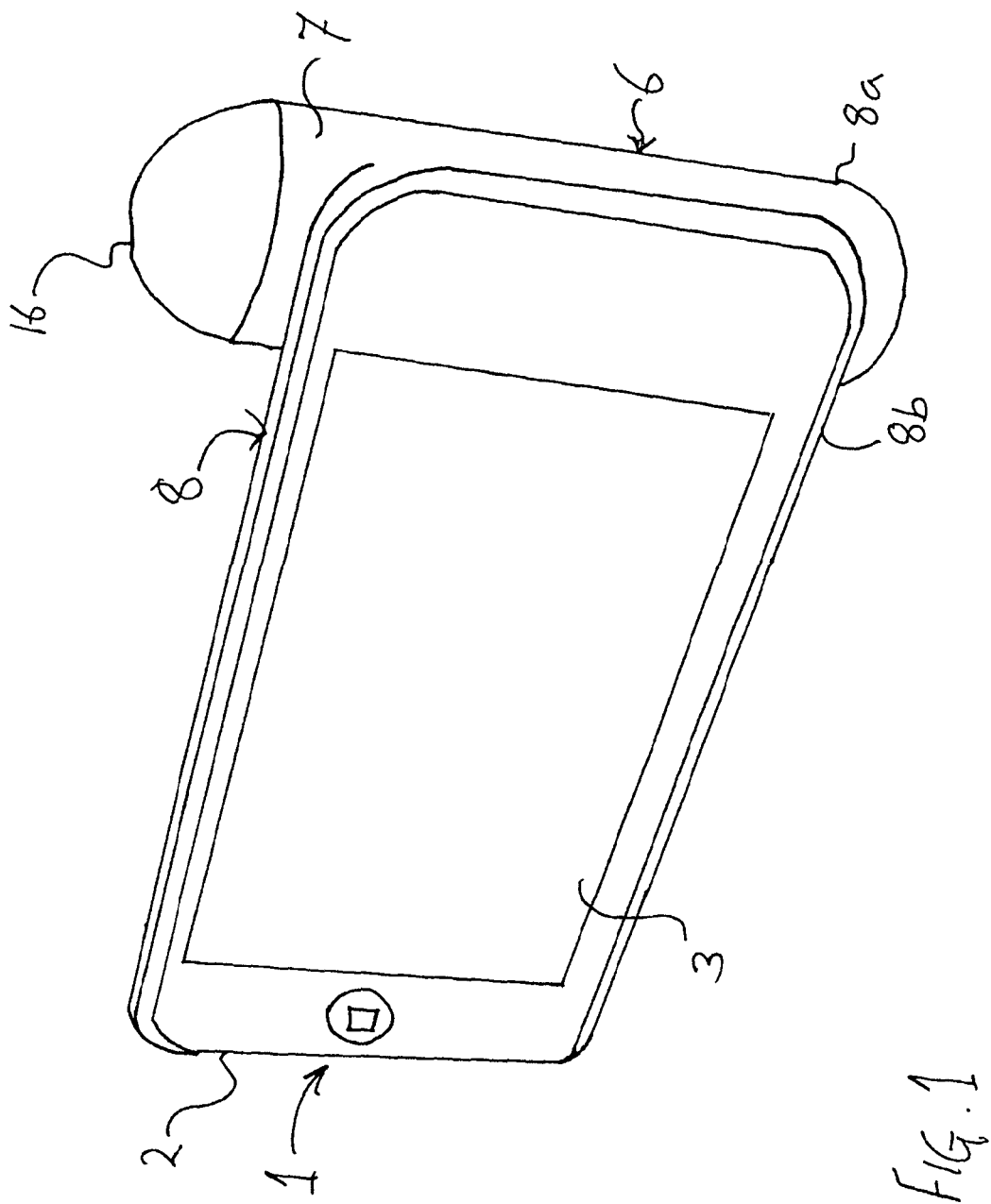
FIG. 1 is a perspective view of a personal communication device (PCD) and an attachment according to the present invention in a first position.

Like reference numerals refer to like parts throughout the specification.

With reference to FIGS. 1-4, a personal communication device in the form of a smartphone handset is shown and indicated generally by the reference numeral 1. The handset 1 comprises a main body 2 that houses all of the components and circuitry of the smartphone. The main body 2 also comprises a large, touch-sensitive screen 3, which the user employs to navigate his way around the features of the smartphone and to interact with them. The screen 3 is also used to display images and for video playback and games play. A camera 4 (FIGS. 4a and 4b) is built in to the main body 2. The camera 4 comprises a simple lens 5 and an electronic image sensor (not shown), such as a CCD or CMOS sensor chip. Still images and video footage taken by the camera 4 may be displayed on the screen 3. The handset 1 also comprises other components, such as transceivers, microchips (such as a SIM card), microphones, infrared sensors, data storage devices and a battery, but these do not form the basis of the present invention and so are not described in detail here.

An attachment 6 is provided for the handset 1. The attachment 6 comprises an optical device 7 and a cover 8. The cover 8 allows the optical device 7 to be detachably mounted to the main body 2 of the handset 1 in a fixed relationship with respect to the lens 5 of the camera 4. The fixed relationship comprises a predetermined position and orientation with respect to the lens 5. In this embodiment, the optical device 7 extends from a broad side of the handset 1 in a plane approximately parallel to the plane of the lens 5. The portion 8a of the cover 8 is arranged to house the optical device 7. In this embodiment, the portion 8b of the cover 8 is arranged to fit over the face of the handset 1 opposite the face on which the screen 3 is formed, so that the cover 8 fits over the lens 5. The optical device 7 is arranged to capture light from a panoramic field of view and to reflect it into the lens 5.

Figure 4A:
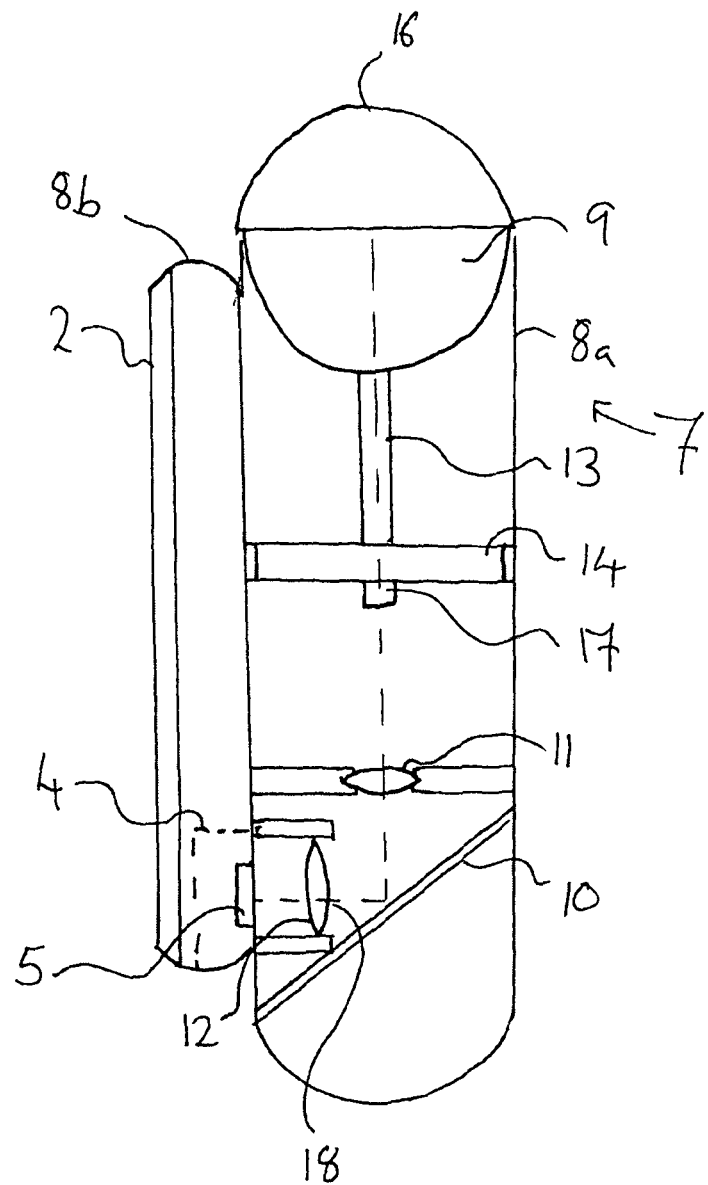
FIG. 4a is a side view of the PCD and attachment of FIGS. 1-3 in the first position, partly in section.
Figure 4B:
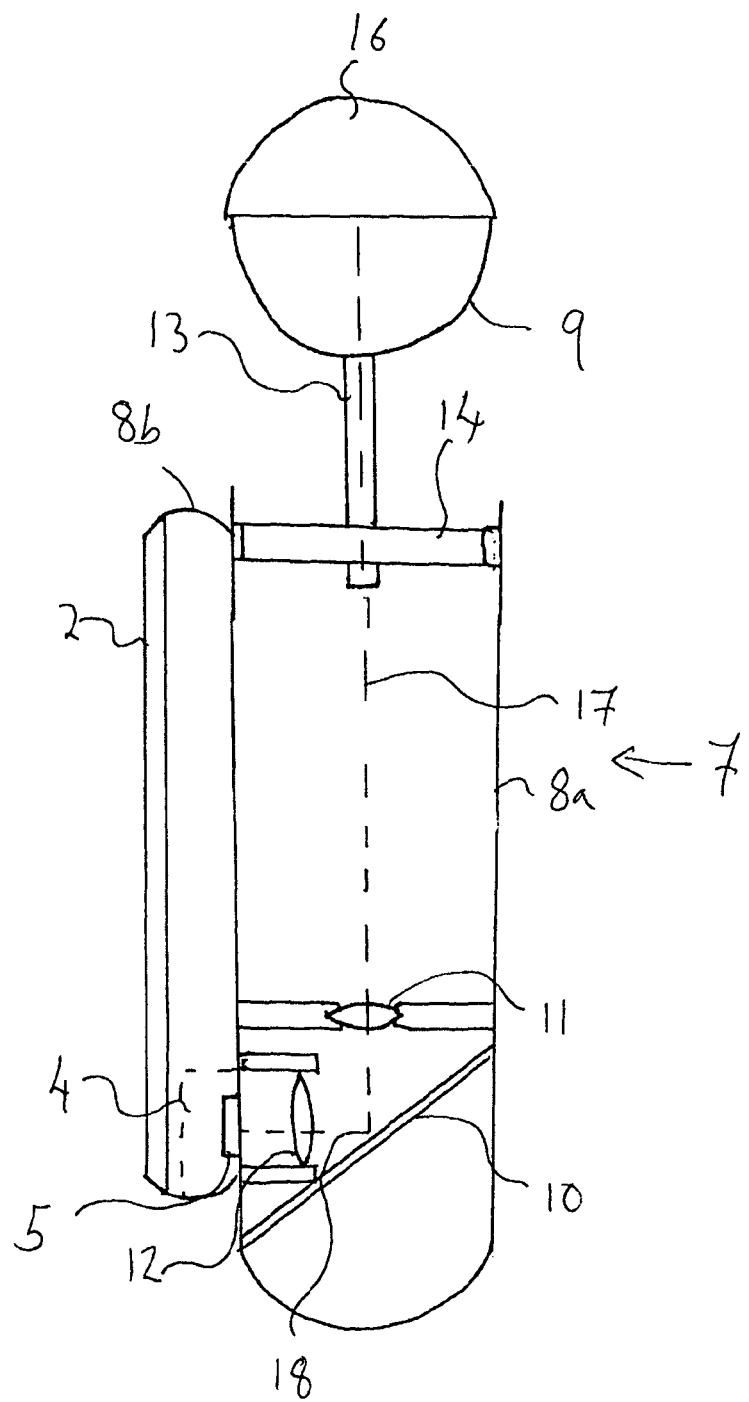
FIG. 4b is a is a side view of the PCD and attachment of FIGS. 1-3 in the second position, partly in section.

The optical device 7 is shown in more detail in FIGS. 4a and 4b. The optical device 7 comprises a light capturing device in the form of a convex mirror 9; a plane mirror 10; and lenses 11, 12. The convex mirror 9 has the shape of an inverted dome and is arranged to capture light from a panoramic field of view of substantially 360°. The contour of the reflective surface of the convex mirror 9 may be defined by a cubic function. Using a geometric projection based on a cubic function allows for a mirror having a large vertical field of view to be produced. Alternatively, the mirror may have a simple part-spherical reflective surface. In this embodiment, the convex mirror 9 captures light from a field of view of 52° above the horizon and 52° below it, making for a total vertical field of view of 104°.

Figure 2:
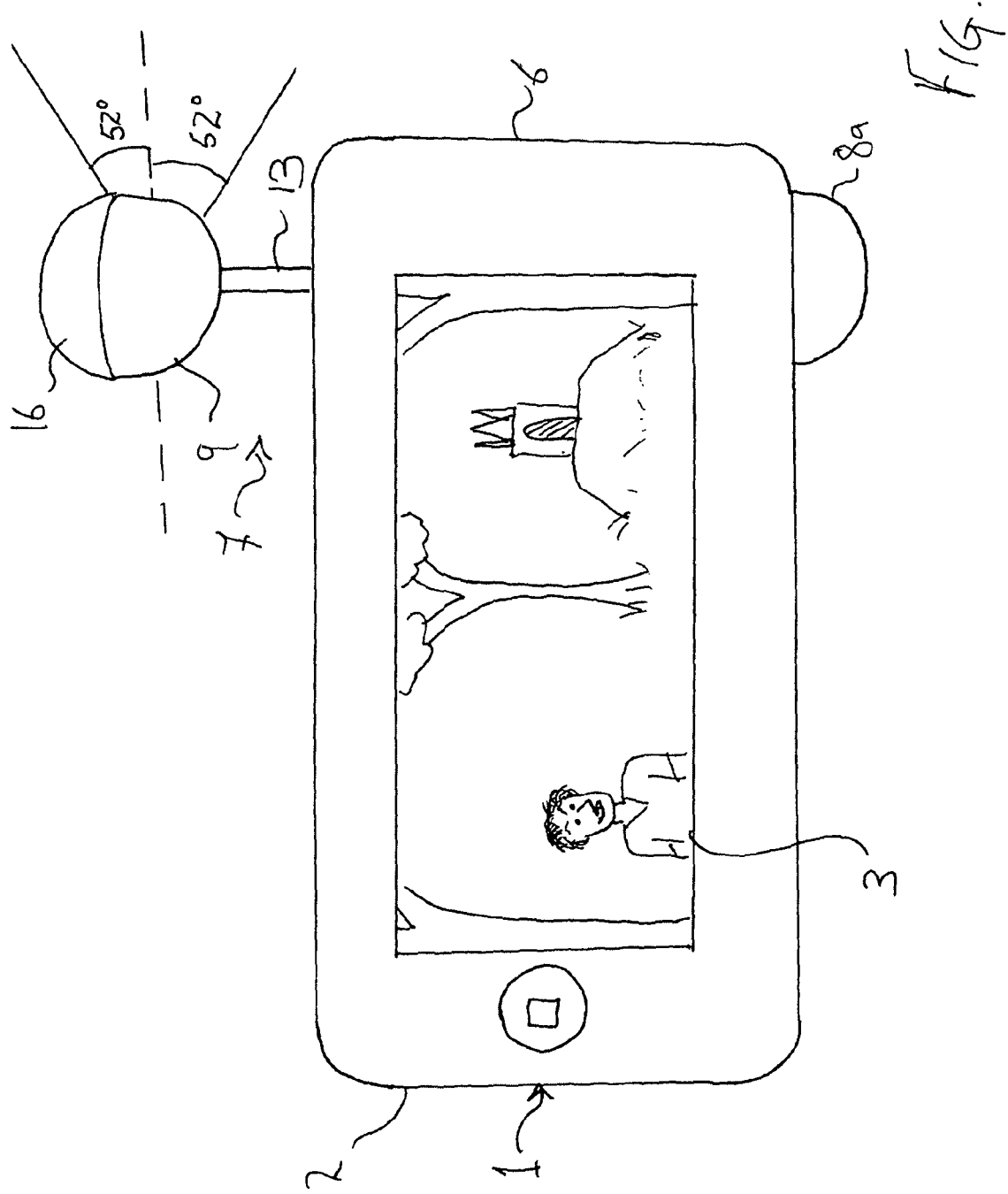
FIG. 2 is a front view of the PCD and attachment of FIG. 1 in a second position.
Figure 3:
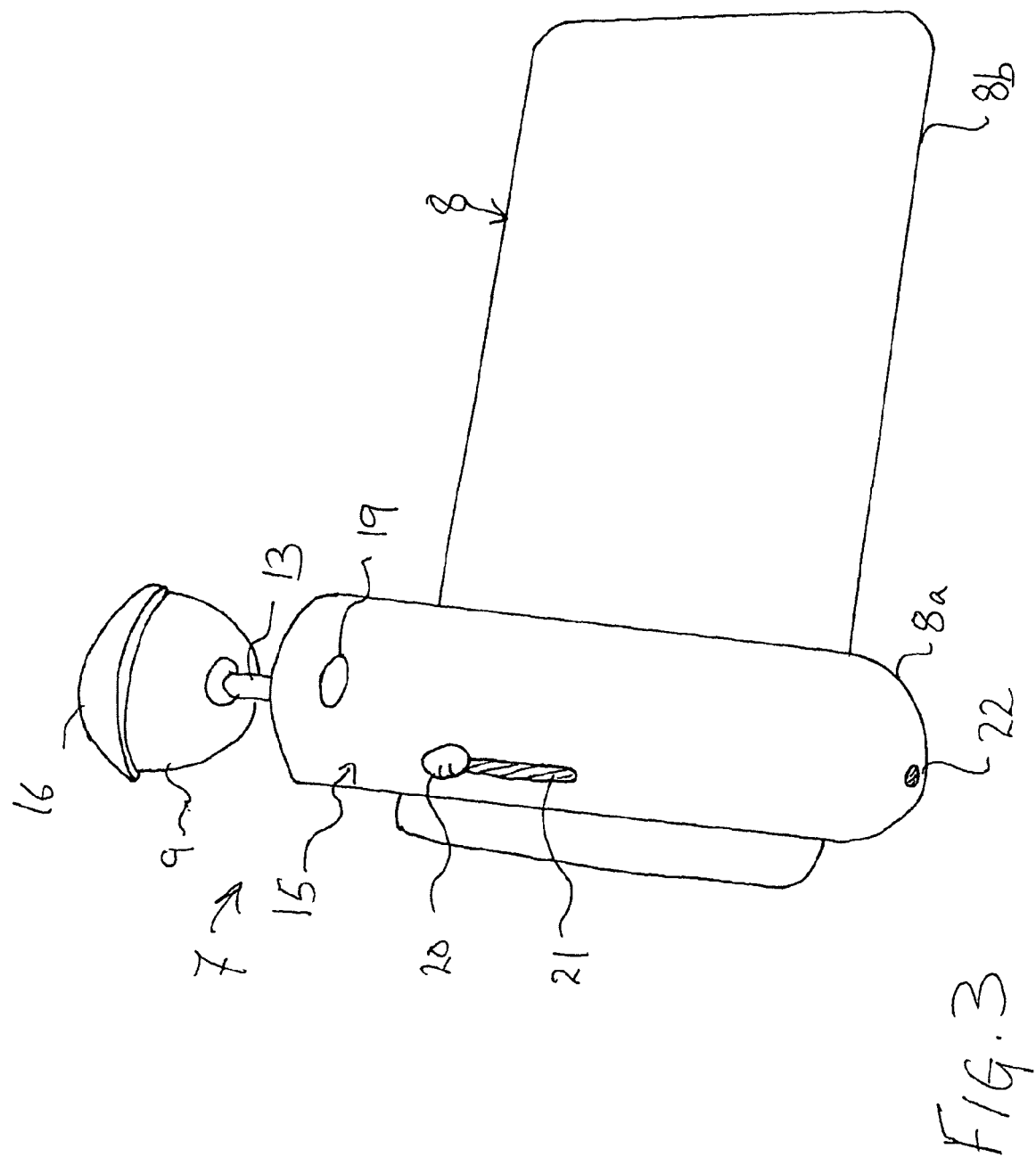
FIG. 3 is a perspective rear view from below of the PCD and attachment of FIGS. 1 and 2 in the second position.

The convex mirror 9 is supported inside the portion 8a of the cover 8 by means of a rod 13 that extends from the central region of the convex mirror to a transparent window 14. The window 14 is movably connected to the interior of the portion 8a of the cover by means of an adjustment mechanism 15 (FIG. 3). The adjustment mechanism 15 permits the user to move the window 14, and hence the convex mirror 9 of the optical device 7 between a stored position (FIGS. 1 and 4a) and an operating position (FIGS. 2, 3, 4b). The adjustment mechanism 15 is described in more detail later in the specification. In the stored position, the convex mirror 9 is protected from damage by its housing, which comprises the portion 8a of the cover 8. The convex mirror 9 may be further protected by means of a cap 16, which is in intimate contact with the portion 8a of the cover 8 in the stored position. The cap 16 may be made of the same material as the cover 8 in order to provide an aesthetically pleasing arrangement.

In the operating position of FIGS. 2, 3 and 4b, the convex mirror 9 captures light from the scene and directs it along a first optical axis 17, which is co-incident with the rod 13. Light from the convex mirror 9 passes through the window 14 and the first lens 11. The plane mirror 10 is transverse to the first optical axis 17; in this embodiment it is at 45° to the first optical axis. Thus, light arriving at the plane mirror 10 is reflected through substantially 90°. Light reflected by the plane mirror 10 passes through the second lens 12, which may be a macro type of lens, before being received by the lens 5 of the camera 4. The lens 5 of the camera 4 has a second optical axis 18. The light reflected by the plane mirror 10 is substantially parallel to the second optical axis 18. Thus, the optical device 7 is located in a fixed relationship with respect to the camera 4 of the handset 1. Light captured from the scene and reflected by the convex mirror 9 along the first optical axis 17 is transmitted to the lens 5 of the camera 4 in the manner of a periscope.

It will be appreciated that an image thus produced by the optical device 7 and received at the image plane of the camera 4 will be a warped circular image. Therefore, the handset 1 will need to be loaded with software arranged to process the image data and transform its picture elements to rectilinear coordinates. Such programs may be downloaded by the user as an application appropriate to the handset 1. Such programs require relatively little processing power, and so images generated by the optical device may be "unwrapped" and displayed on the screen 3 in a very short period of time. Thus, it is envisaged that the screen 3 can be used as a virtual view finder by the user, as is represented schematically in FIG. 2.

When the user is satisfied with the image of the scene as displayed on the screen 3, the user simply activates the camera 4 in order to write the currently displayed image to the phone's memory. The user can call up the image from the memory for display on the screen 3. The user can then employ the controls of the handset 1 and the touch-sensitive screen 3 to navigate the image, to zoom in on parts of the image and to scroll through the panorama displayed on the screen. The user may also tag features of the image, such as landmarks or people, and upload the images to social networking websites, weblogs, photo-sharing websites or news channels. Alternatively, the images may be sent as attachments to e-mails or as multi-media messages. The process of capturing images has been described with reference to a still image, but of course video footage may also be produced by the present invention and then published and/or distributed as described above.

As mentioned above, an adjustment mechanism 15 is provided in order to permit the user to move the convex mirror 9 with respect to its housing (the portion 8a of the cover) between the stored position and the operating position. The adjustment mechanism 15 could take many forms. For example, resilient means in the form of a helical spring (not shown) could be connected to the transparent window 14 such that the spring is under compression or extension when the convex mirror 9 is in the stored position. A user-operable button 19 is provided in a conspicuous position and, when pressed, causes the spring to release so that the transparent window 14 is urged upwardly by the force of the spring. Hence, the convex mirror 9 is deployed and put into the operating position in a fast and efficient manner.

After use, the user will wish to put the convex mirror 9 back into the stored position in order to protect it. In this embodiment, a slider mechanism is provided, comprising an actuator 20 slidably movable in a slot 21 formed in the portion 8a of the cover 8. The actuator 20 is connected to the transparent window 14 so that, when the user slides the actuator 20 along the slot 21, the convex mirror 9 retracts smoothly into the protective portion 8a of the cover 8. A latch may be provided to retain the convex mirror 9 in the stored position. The actuator 20 may conveniently take the form of a thumb grip.

The cover 8 further comprises a threaded aperture 22 arranged to accommodate the mounting screw of a tripod. Thus, the user can mount the attachment 6 and handset 1 to a tripod in order to provide a stable position for taking images and recording footage. The aperture 22 can also be used for fastening the attachment 6 in a desired location.

The optical device 7 may be removable from the portion 8a of the cover 8 that houses it, so that the optical device is usable with other cameras. Alternatively, the cover portion 8a housing the optical device 7 may be detachable from the portion 8b for use with other devices, and then re-attachable when required.

Figure 5:
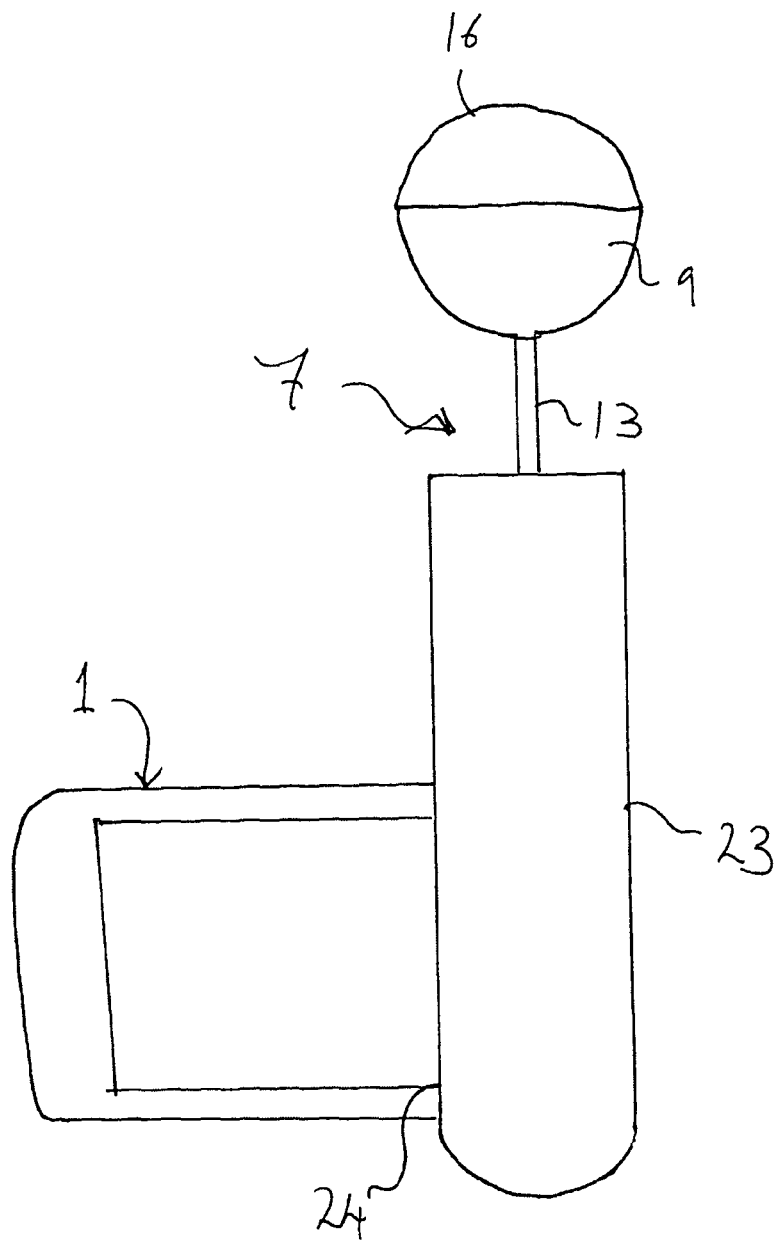
FIG. 5 is a front view of a PCD and attachment constructed according to an alternative embodiment of the invention.

A first alternative embodiment is shown in FIG. 5. In this arrangement, the convex mirror 9 and its associated optical components are located in a larger housing 23. The housing 23 includes an aperture 24, into which the user inserts the end portion of the handset 1 that incorporates the lens 5 of the camera 4. The aperture 24 is arranged so that, when the handset is inserted into it, the optical device 7 is in a fixed relationship with respect to the lens 5. It is envisaged that the optical arrangement will be very similar to that described above with reference to FIG. 4b, with light being captured by the convex mirror 9 and reflected into the lens 5 in the manner of a periscope.

Another alternative embodiment is shown in FIGS. 6 to 9. In this arrangement, the optical device 7 is located in a housing 25 which may be detachably mounted to a cover 26, which is itself detachably mounted to the handset 1. As before, the cover 26 fits over a face of the handset 1 opposite the face incorporating the screen 3. The cover 26 includes a guide 27. When the cover 26 is attached to the handset 1, the guide 27 is adjacent the lens 5 on the handset 1. The housing 25 has a lug 28, which co-operates with the guide 27. The user can slide the lug 28 into the guide 27 and so attach the housing 25 to the cover 26. This arrangement facilitates the mounting of the optical device 7 to the handset 1 and its removal. The cover 26 also includes the threaded aperture 22 arranged to accommodate the mounting screw of a tripod.

In this embodiment, the handset 1 is used in a different position and orientation from that shown in the embodiment of FIGS. 1 to 4, with the optical device 7 extending from a narrow side of the handset. An advantage of this arrangement is that, in use, the optical device 7 can capture light from a large vertical field of view without the handset 1 accidentally appearing in the captured image. Many PCD handsets include gyroscopes to detect the orientation of the PCD so that images on the screen 3 are displayed to the user automatically in the correct orientation.

Figure 6:
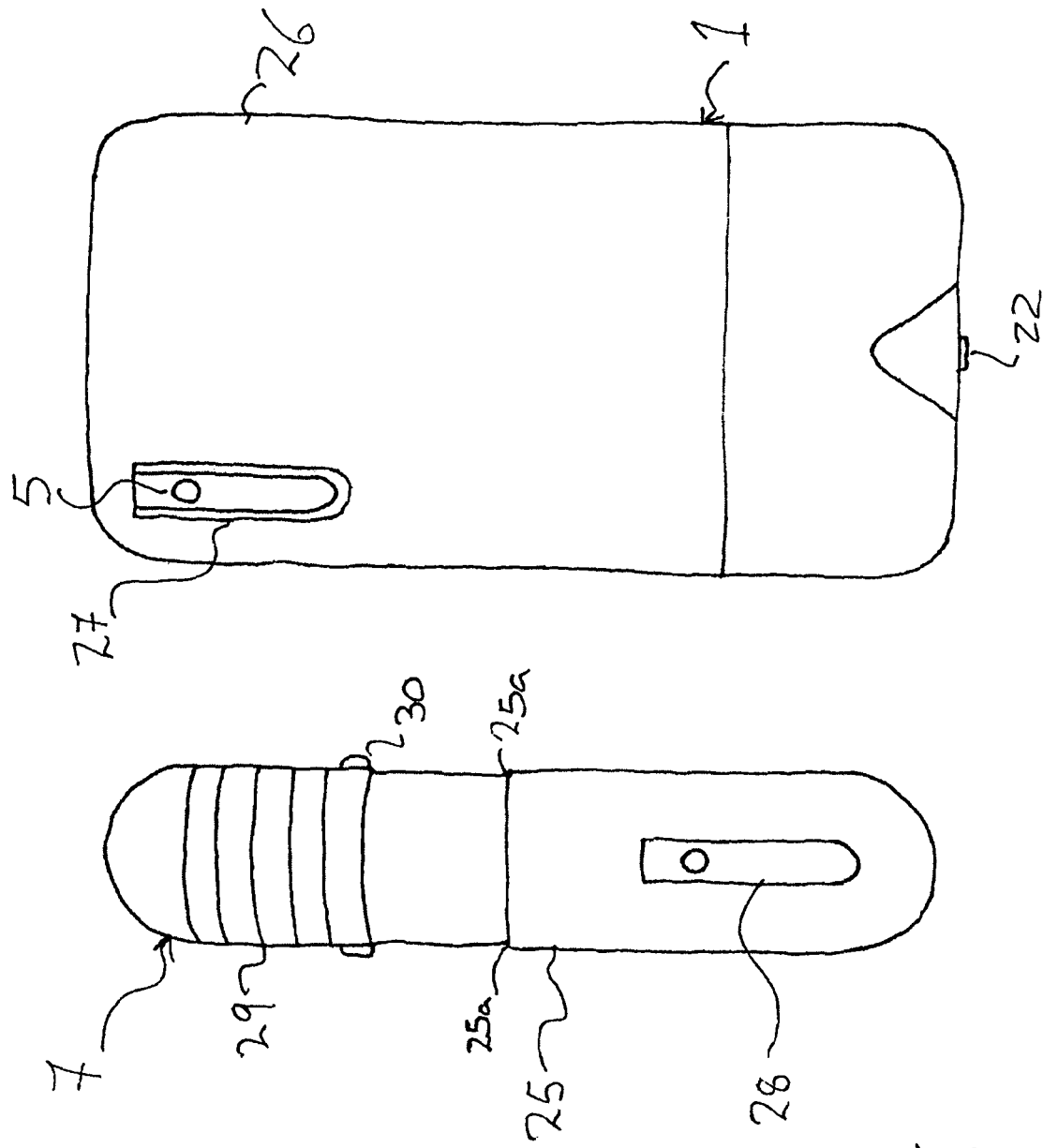
FIG. 6 shows separately a PCD and an attachment constructed according to another alternative embodiment of the invention, the attachment being in a first position.
Figure 7:
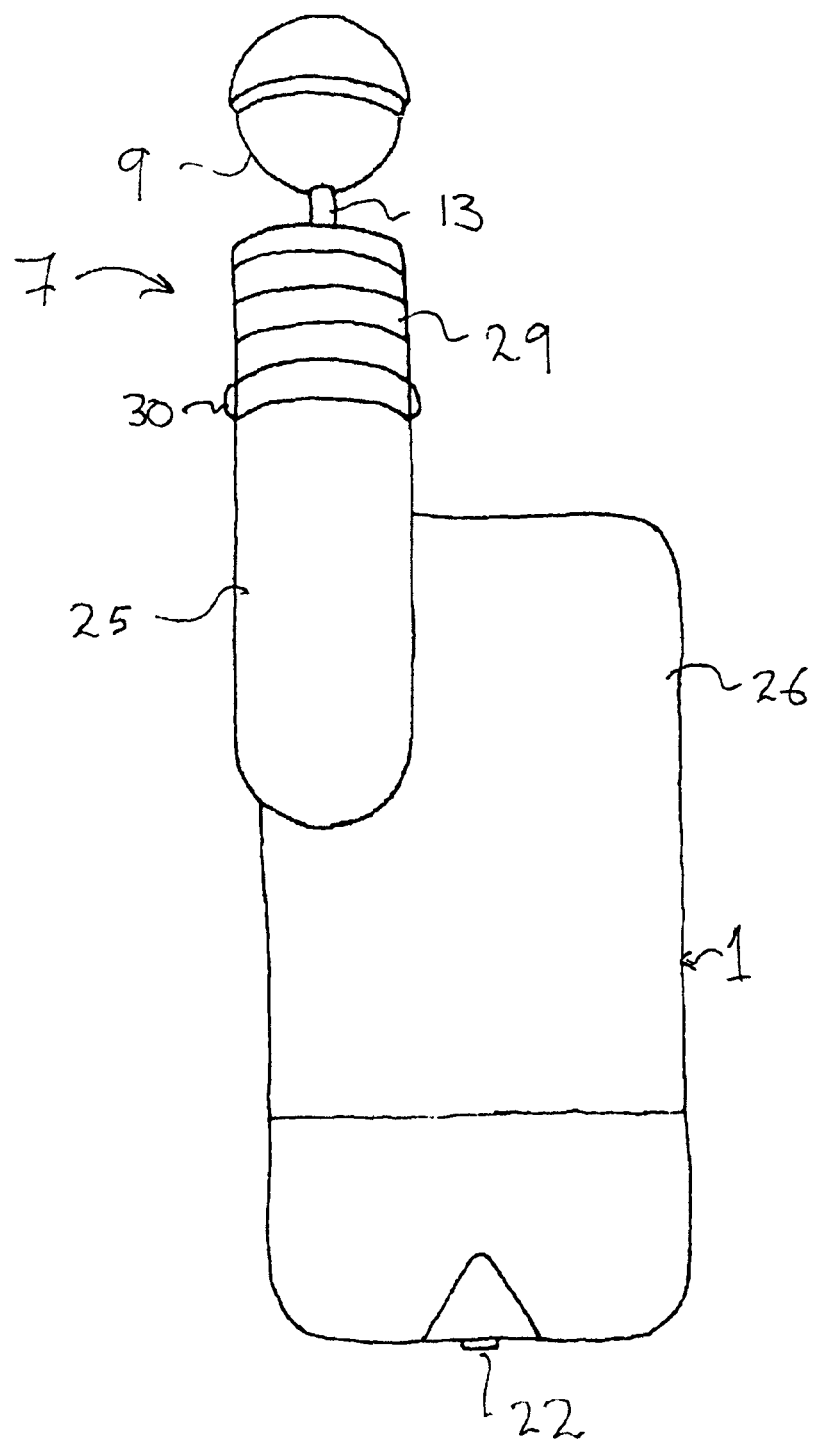
FIG. 7 is a rear view of the PCD and attachment of FIG. 6, with the attachment mounted to the PCD and in a second position.
Figure 8:
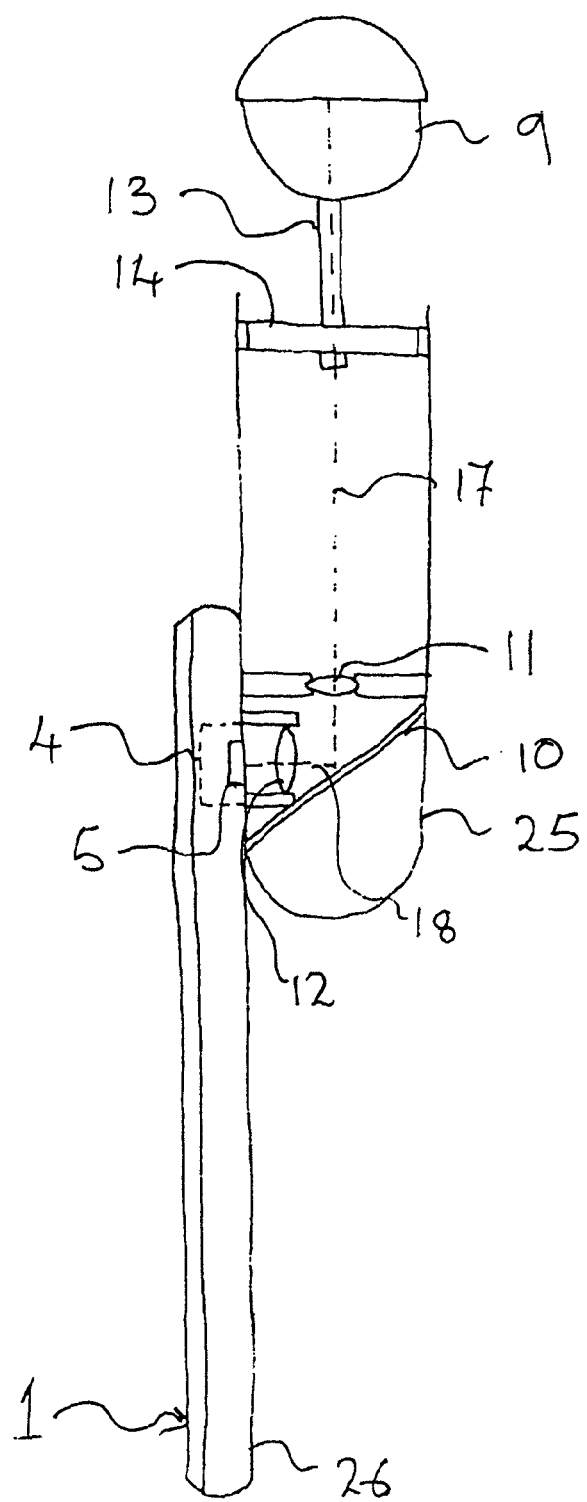
FIG. 8 is a side view of the PCD and attachment of FIG. 7, partly in section.
Figure 9:
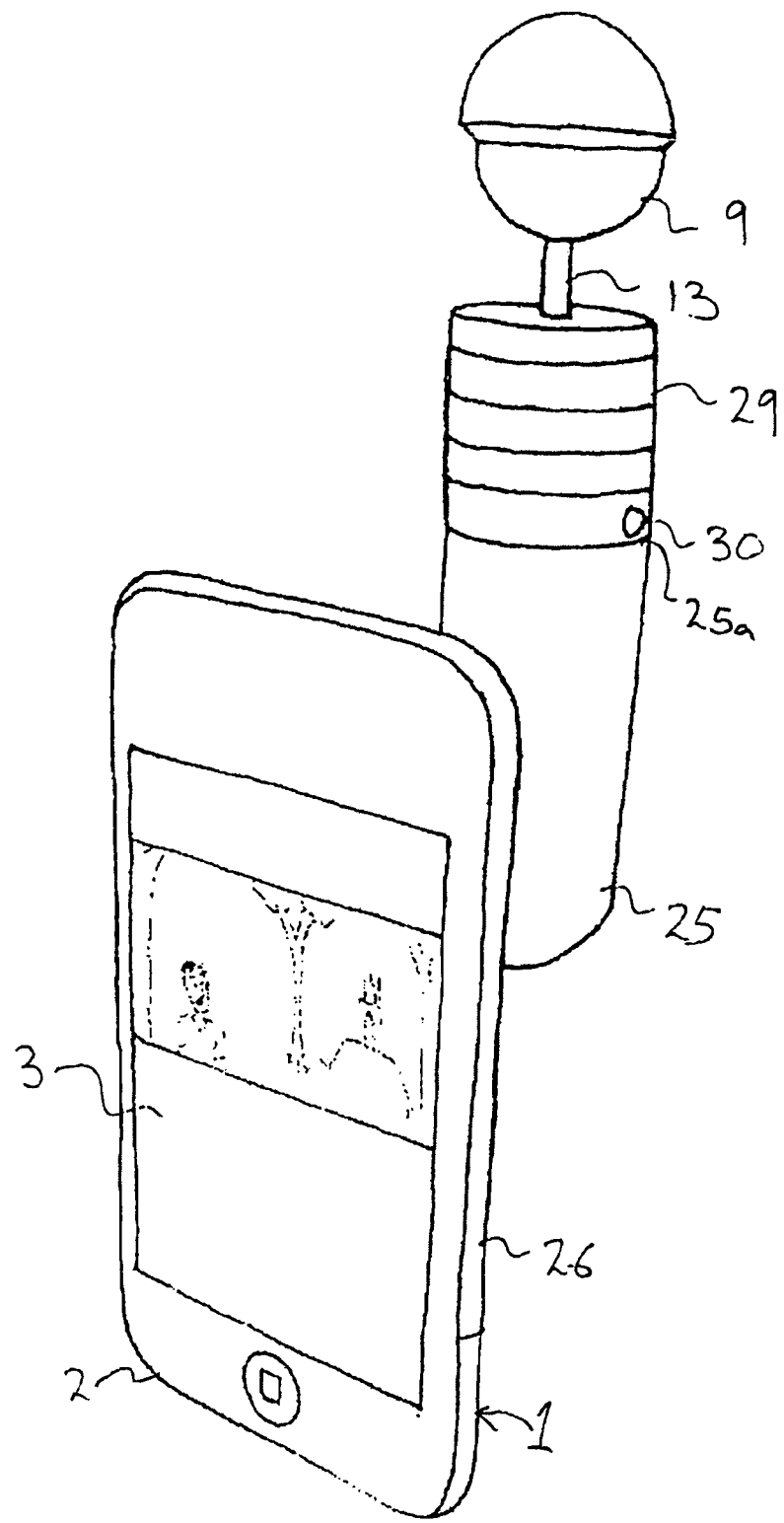
FIG. 9 is a front perspective view of the PCD and attachment of FIG. 7.

As before, the optical device 7 comprises a convex mirror 9 arranged to capture light from a panoramic field of view. The plane mirror 10 and lenses 11, 12 are arranged to reflect light into the lens 5 of the camera 4 in the handset 1 in the manner of a periscope, as described above. In this embodiment, the window 14, and hence the convex mirror 9, is held stationary within the housing 25. A portion of the housing 25 forms a visor 29, arranged to protect the convex mirror 9 in the stored position (FIG. 6). The optical device 7 is put into the operating position (FIGS. 7 to 9) by moving the visor 29 away from the convex mirror 9 so that it may be exposed to light from the scene.

In order to put the optical device 7 into the operating position, the user depresses an actuator in the form of a button 30 on the visor 29. The actuator releases the visor 29 from its position covering the convex mirror 9, so that the user can slide the visor down to reveal the convex mirror for use. The housing 25 includes shoulders 25a, which act as stops for the visor 29 when it is being moved into the operating position. When the user has finished using the optical device 7, he simply slides the visor 29 back up until it covers the convex mirror 9, so protecting it from dust and damage. The user can elect to leave the housing 25 attached to the cover 26 on the handset 1, or else can remove the housing (and hence the optical device 7) from the cover in order to use the camera 4 and the handset 1 in a conventional manner.

Figure 11A:
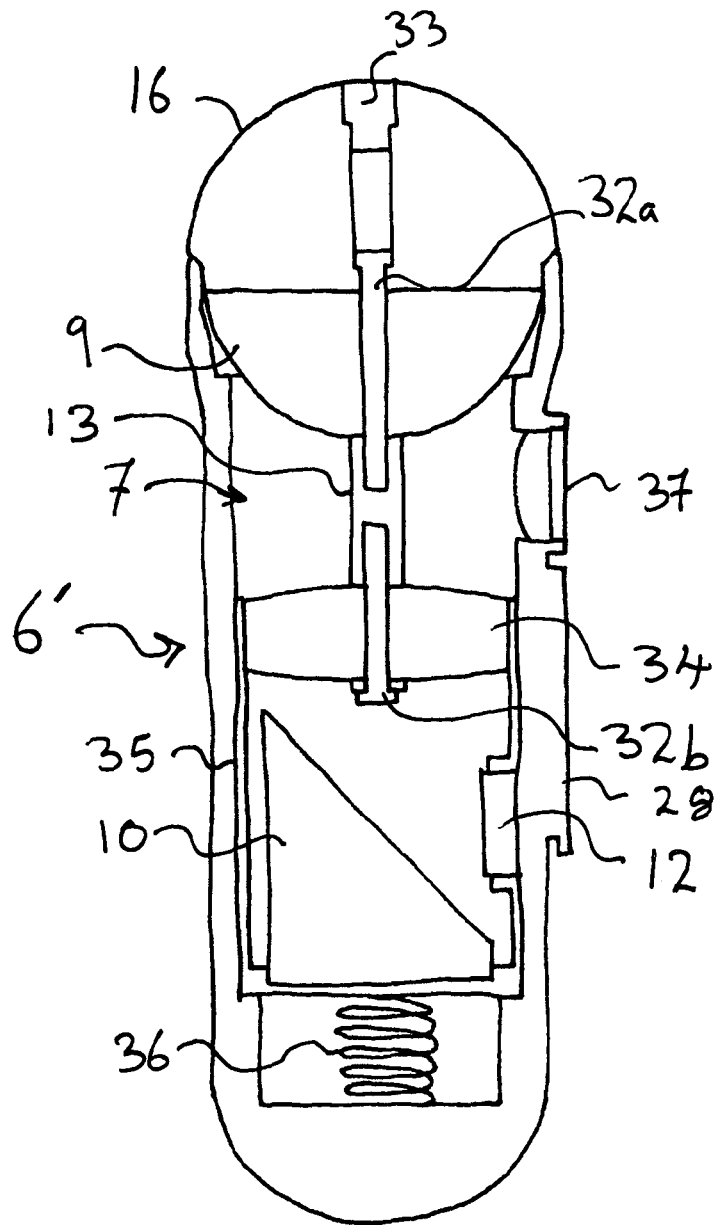
FIG. 11a is a sectional side view of an attachment constructed according to another alternative embodiment of the invention in a first position.
Figure 11B:
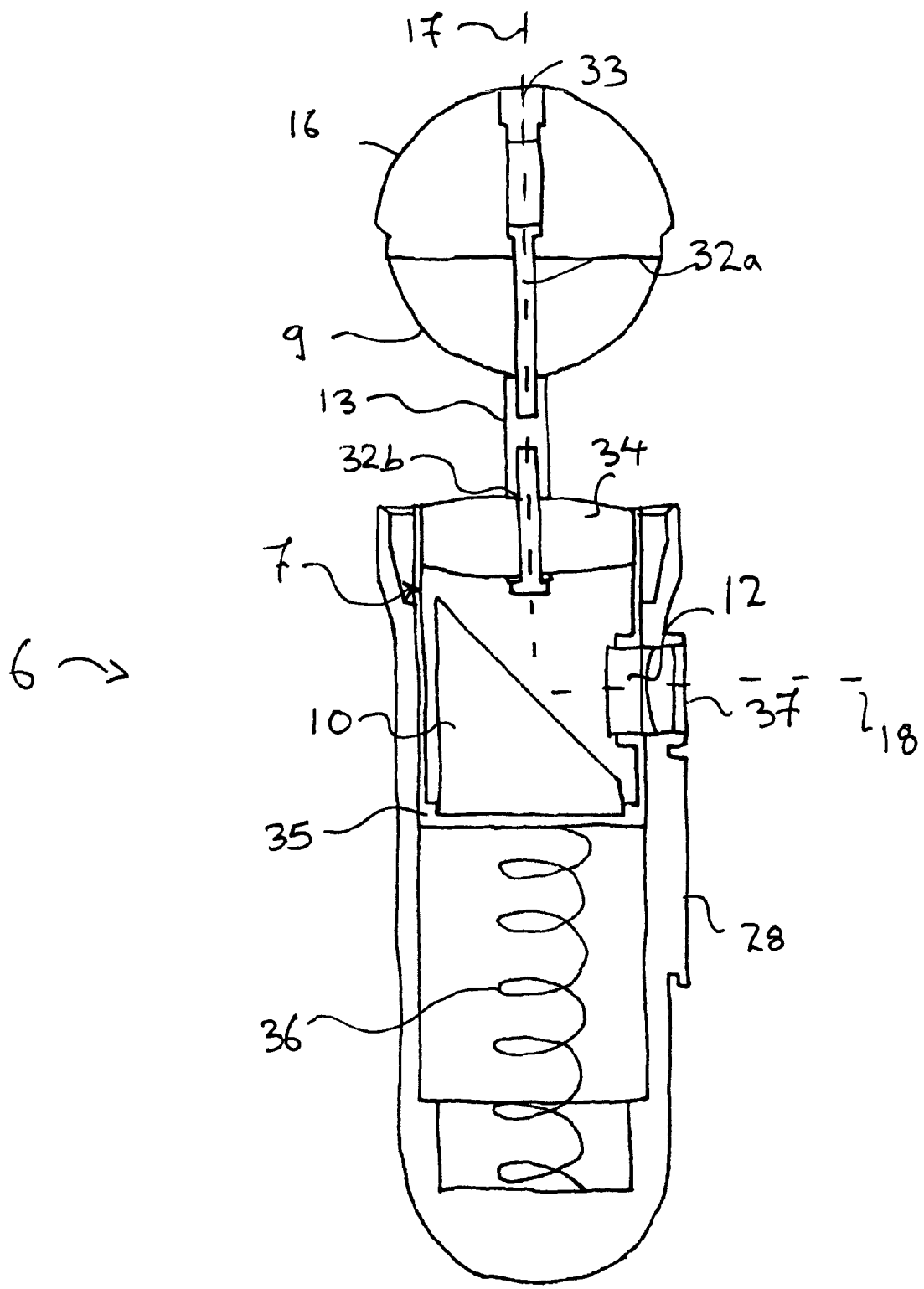
FIG. 11b is a sectional side view of the attachment of FIG. 11a in a second position.

Another alternative embodiment of the invention is shown in FIGS. 11a and 11b. In these drawings only the attachment 6' is shown. The attachment 6' attaches to the handset 1 by means of lug 28 in a similar manner and in the same orientation as the attachment of FIGS. 6 to 9. The attachment of FIGS. 11a and 11b differs from the previously-described embodiments in the structure of its optical device 7.

The optical device 7 includes a convex mirror 9 which, as with previous embodiments, is arranged to capture light from a panoramic field of view. The convex mirror 9 is attached by a fastener such as a screw 32a to the rod 13 that extends from the central region of the convex mirror. The screw fastener 32a is inserted into the rear, non-reflecting side of the convex mirror 9. A plug 33 is arranged to cover over the screw fastener 32a to prevent a user tampering with the screw. The plug 33 may form part of, or be covered by, the cap 16. In this embodiment, the other end of the rod 13 attaches to a large lens 34. This lens 34 replaces the window 14 and first lens 11 of the previously-described arrangements. Another fastener 32b is inserted through the lens 34 and into the end of the rod 13. This locates the rod 13—and hence the convex mirror 9—in a fixed position and orientation with respect to the lens 34. The optical device 7 further comprises a plane mirror 10 and a second lens 12 as before, with the mirror 10 being arranged, in use, to reflect light from the convex mirror 9 into the lens 12.

The plane mirror 10 and lenses 12, 34 are conveniently housed in a sleeve 35. The sleeve 35 has a closed end and resilient means in the form of a helical spring 36 bears against the closed end of the sleeve in order to urge the optical device to slide into the operating position of FIG. 11b when released from the stored position of FIG. 11a by a user depressing a button (not shown in this drawing). This arrangement of components in a sleeve simplifies the mounting and alignment of the optical components. Thus, the main components of the optical device 7 are in the same fixed relationship with respect to each other in both the stored and operating positions, which reduces the chances of misalignment in use. This arrangement makes for a more reliable and robust optical imaging system. The lens 34, mirror 10 sleeve 35 and second lens 12 may even be manufactured as one piece. This embodiment further comprises a cover glass 37, which protects the lens 12 from damage.

Figure 10:
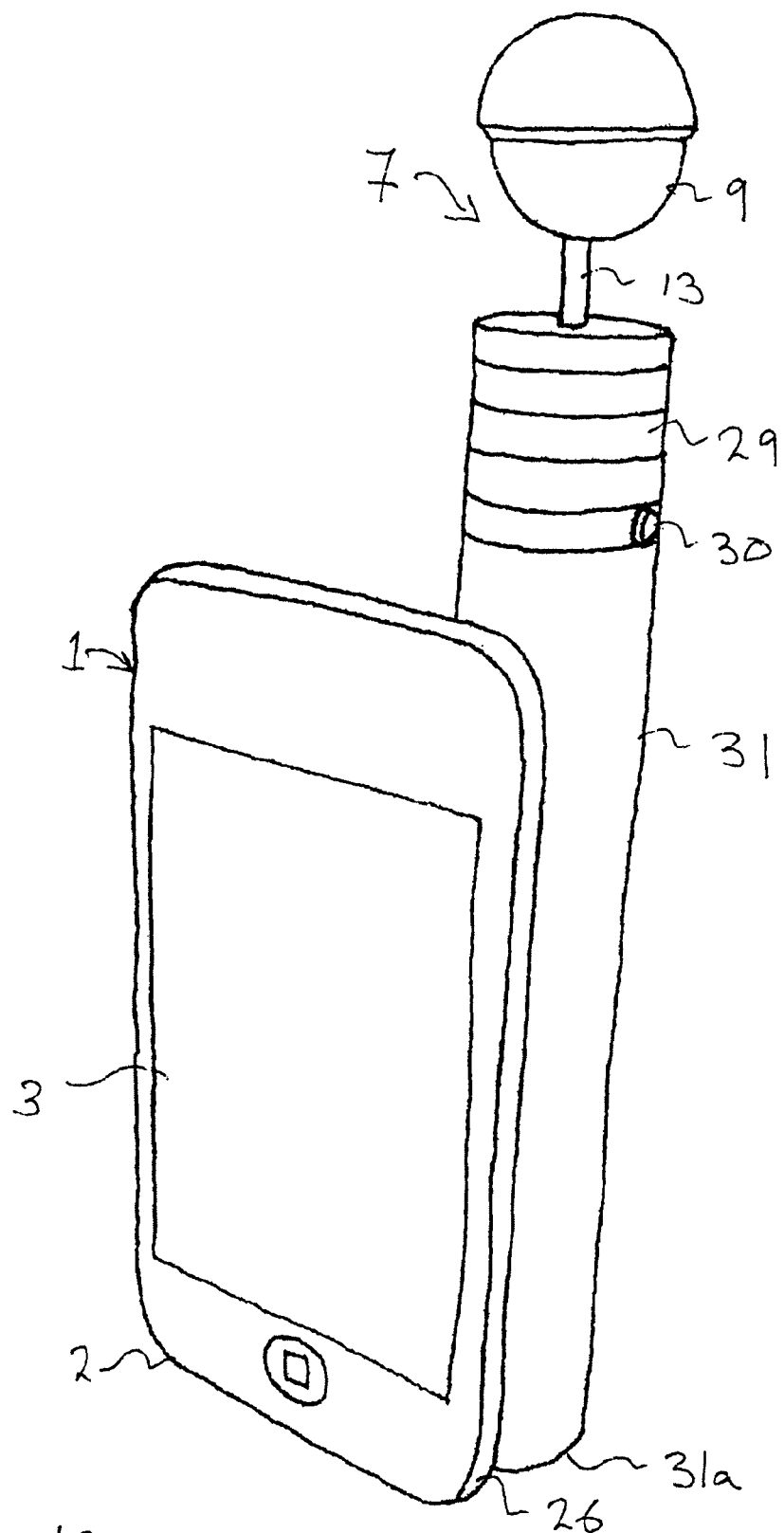
FIG. 10 is a front perspective view of a PCD and attachment constructed according to a further alternative embodiment of the invention.

A further alternative embodiment of the invention is shown in FIG. 10. In this arrangement, the optical device 7 is located in an elongated housing 31 that may be attached to, and removed from, the cover 26 on the handset 1, just as in the embodiment of FIGS. 6 to 9. The elongated housing 31 is arranged so that, when it is attached to the handset 1, it extends to the end of the handset. The elongated housing 31 has a flattened end 31a, which lies adjacent an edge of the handset and serves as a stabiliser so that the combination of the panoramic optical device 7 and the handset 1 may be placed on a horizontal surface in use. A similar arrangement can be provided for the embodiment of FIGS. 1 to 4 and the embodiment of FIG. 5.

Further variations may be made without departing from the scope of the invention. For example, the covers 8; 26 may be arranged to fit onto the main body 2 of the handset 1 in a snap-fit manner or may alternatively be arranged to slide over a face of the main body. The cover may be made of a resilient material such as rubber, in which case the cover may be arranged to stretch over the side walls of the main body 2. Alternatively, fastenings may be used to attach the cover to the main body 2, bearing in mind the need to keep the screen 3 free from obstructions. The cover may be made of any suitable material: rubber has been mentioned above, but plastic, metal, fabric or leather may be employed. Composite materials may also be used. An advantage of using plastics material is that a wide variety of colours, patterns and textures may be achieved.

The dimensions and contours of the attachment will depend on several factors including the configuration of the optical device 7; the size and shape of the main body 2 of the PCD; and the location and orientation of the PCD's in-built camera.

The light capturing device need not be the convex mirror 9: a plurality of plane mirrors or a faceted mirror may be employed, although the image quality will not be as good as with a convex mirror. Alternatively, a suitable panoramic lens may be utilised, or a combination of lenses and mirrors. A fish-eye type of lens may also be used; however it will be appreciated that the image from a fish-eye lens is prone to distortion, and so extra processing will be required to generate good quality images.

The panoramic field of view captured by the optical device 7 need not be 360°. The optical device 7 may be configured to produce 180° panoramas, for example. Furthermore, the vertical field of view may be varied by using a convex mirror 9 of different dimensions. A vertical field of view of between 90° and 120° is easily achievable.

The first optical axis 17 of the convex mirror 9 and the second optical axis 18 of the lens 5 of the camera 4 need not be exactly orthogonal; alternative arrangements are possible having the first and second optical axes transverse to one another.

The adjustment mechanism 15 was described above in relation to the embodiment of FIGS. 1 to 4 as separate respective mechanisms for the deployment and retraction of the convex mirror 9, but a combined mechanism could be provided. The adjustment mechanism may be wholly mechanical, as described above, or could be electro-mechanical in form by employing, for example, small servo-motors to adjust the relative positions of the convex mirror 9 and its protective cover or visor as required by the user. Alternatively, the optical device 7 could be arranged to remain permanently in the operating position, although this has the disadvantage of leaving the convex mirror 9 vulnerable to damage.

The invention lends itself to many applications beyond taking photographs and video footage of a panoramic scene. The invention may be used in connection with Global Positioning Systems (GPS) for navigation purposes or for so-called augmented reality applications. In augmented reality, the user sees additional layers of data when viewing an image of a scene. Such data may alert the user to nearby restaurants, landmarks or public transport facilities, for example. In providing a panoramic image, the user is able to see data from his complete surroundings, rather than merely from the scene directly in front of him. The invention may also be used as a security device that may be easily set up in the home to monitor a scene or to check on the well-being of the elderly or infirm. The invention may also be used in gaming applications: images taken by the user may be incorporated in video game play. The attachment may itself be used as a controller in a video game application: data and images from the optical system may be communicated automatically to a gaming device, which can then be employed to create immersive gaming environments for the user. The invention may also be utilised in connection with design or planning software for the purposes of environmental design or site management.

What is claimed is:

1. An attachment for a personal communication device comprising a main body incorporating a camera, the attachment comprising an optical device arranged to be detachably mountable to the main body in a fixed relationship with respect to the lens of the camera, the optical device being arranged to reflect light into the lens from a panoramic field of view, wherein the attachment comprises a housing for the optical device and a cover which is detachably mountable to at least a portion of the main body of the personal communication device and wherein the housing is detachably mountable to the cover, the optical device comprises a light capturing device in the housing, and the optical device is adjustable between an operating position and a stored position by relative movement between the light capturing device and a portion of the housing.

2. The attachment as claimed in claim 1, in which the optical device is arranged to reflect light from a panoramic field of view of at least 180°.

3. The attachment as claimed in claim 1, in which the optical device is arranged to reflect light from a panoramic field of view of substantially 360°.

4. The attachment as claimed in claim 1, further comprising an adjusting mechanism arranged to be operable by the user in order to control the position of one of the light capturing device and the portion of the housing between the operating and stored positions.

5. The attachment as claimed in claim 1, in which the light capturing device has a first optical axis and the lens of the camera has a second optical axis, and the fixed relationship between the optical device and the main body is a such that the first optical axis is transverse to the second optical axis.

6. The attachment as claimed in claim 5, in which the optical device further comprises a mirror arrangement arranged to reflect light from a direction substantially parallel to the first optical axis to a direction substantially parallel to the second optical axis.

7. The attachment as claimed in claim 1, in which the light capturing device comprises a convex mirror.

8. The attachment as claimed in claim 6, in which the light capturing device and the mirror arrangement are located in a predetermined position and orientation with respect to each other in both the stored and operating positions.

9. The attachment as claimed in claim 1, in which a portion of the cover is resilient, so that it is attachable to the main body by being stretched over it.

10. The attachment as claimed in claim 1, in which the cover is detachably mountable to the main body by means of fasteners.

11. The attachment as claimed in claim 1, in which the cover is detachably mountable to the main body by means of a snap-fit or sliding fit arrangement.

12. A combination of a personal communication device having a main body incorporating a camera, with an attachment; the attachment comprising an optical device arranged to be detachably mountable to the main body in a fixed relationship with respect to a lens of the camera, the optical device being arranged to reflect light into the lens of the camera from a panoramic field of view, wherein the attachment comprises a housing for the optical device and a cover which is detachably mountable to at least a portion of the main body of the portable communication device and wherein the housing is detachably mountable to the cover, the optical device comprises a light capturing device in the housing, and the optical device is adjustable between an operating position and a stored position by relative movement between the light capturing device and a portion of the housing.

13. The combination of a personal communication device and an attachment as claimed in claim 12, in which the person communication device is one of: a mobile phone; a smartphone; a personal digital assistant; a portable personal computer; or a handheld games console.

14. A method of recording a panoramic image of a scene, comprising the steps of: attaching an optical device to a personal communication device having a camera such that the optical device has a fixed relationship with respect to a lens of the camera, the optical device being arranged to reflect light into the lens of the camera from a panoramic field of view, wherein the optical device is housed in a housing which is detachably mountable to a detachably mountable cover for the portable communication device, wherein the optical device comprises a light capturing device in the housing, and the optical device is adjustable between an operating position and a stored position by relative movement between the light capturing device and a portion of the housing; and sensing and recording an image of the panoramic field of view by means of the camera.

* * * * *